United States Patent
Ishige

(10) Patent No.: US 9,501,722 B2
(45) Date of Patent: Nov. 22, 2016

(54) IMAGE CLASSIFYING APPARATUS FOR CLASSIFYING IMAGES AND ELECTRONIC ALBUM CREATING APPARATUS FOR CREATING ELECTRONIC ALBUM CONSISTING OF PLURAL IMAGES

(71) Applicant: CASIO COMPUTER CO., LTD., Tokyo (JP)

(72) Inventor: Yoshiki Ishige, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 580 days.

(21) Appl. No.: 13/934,081

(22) Filed: Jul. 2, 2013

(65) Prior Publication Data

US 2014/0079324 A1    Mar. 20, 2014

(30) Foreign Application Priority Data

Sep. 20, 2012    (JP) .................. 2012-206475

(51) Int. Cl.
| | |
|---|---|
| G06K 9/62 | (2006.01) |
| G06T 11/60 | (2006.01) |
| H04N 1/387 | (2006.01) |
| G06F 17/30 | (2006.01) |
| H04N 1/00 | (2006.01) |

(52) U.S. Cl.
CPC ....... *G06K 9/6267* (2013.01); *G06F 17/30244* (2013.01); *G06T 11/60* (2013.01); *H04N 1/00453* (2013.01); *H04N 1/00461* (2013.01); *H04N 1/3872* (2013.01)

(58) Field of Classification Search
CPC ............. G06F 17/30244; G06K 9/6267; G06T 11/60; H04N 1/00453; H04N 1/00461; H04N 1/3872

See application file for complete search history.

(56) References Cited

U.S. PATENT DOCUMENTS

| | | |
|---|---|---|
| 8,098,896 B2 | 1/2012 | Isomura et al. |
| 8,670,045 B2 | 3/2014 | Nishizawa |

(Continued)

FOREIGN PATENT DOCUMENTS

| | | |
|---|---|---|
| JP | 2002049907 A | 2/2002 |
| JP | 2005303755 A | 10/2005 |

(Continued)

OTHER PUBLICATIONS

Hideo, JP2005-303755, "Image Printer and Program", English Machine Translation, pp. 1-10.*

(Continued)

*Primary Examiner* — Edward Park
(74) *Attorney, Agent, or Firm* — Holtz, Holtz & Volek PC

(57) ABSTRACT

In an image classifying apparatus, an image is designated as a designated image from among plural candidate images, the designated image being one of images to be contained in at least one group, attribute information is obtained from the designated image, selecting conditions of images are decided based on the attribute information obtained from the designated image, at least one image is selected as a selected image to be contained in the group, from among the plural candidate images based on the selecting conditions, and both the designated image and the selected images are classified into the group.

14 Claims, 9 Drawing Sheets

(56) References Cited

U.S. PATENT DOCUMENTS

| | | | | |
|---|---|---|---|---|
| 8,909,563 | B1* | 12/2014 | Jing | G06K 9/00664 |
| | | | | 382/180 |
| 2008/0016491 | A1* | 1/2008 | Doepke | G06F 9/45512 |
| | | | | 717/104 |
| 2010/0088617 | A1 | 4/2010 | Watanabe | |
| 2011/0181617 | A1* | 7/2011 | Tsuda | G06F 3/0481 |
| | | | | 345/619 |
| 2011/0279726 | A1 | 11/2011 | Nishizawa | |
| 2012/0096361 | A1* | 4/2012 | Osten | G11B 27/034 |
| | | | | 715/731 |

FOREIGN PATENT DOCUMENTS

| | | | |
|---|---|---|---|
| JP | 2005-327172 | A | 11/2005 |
| JP | 2006-293986 | A | 10/2006 |
| JP | 2007179198 | A | 7/2007 |
| JP | 2008225586 | A | 9/2008 |
| JP | 2008-250555 | A | 10/2008 |
| JP | 2011-043954 | A | 3/2011 |
| JP | 2011239303 | A | 11/2011 |
| JP | 2012-094067 | A | 5/2012 |

OTHER PUBLICATIONS

Hideta, JP2011-239303, "Information Processor, and Control Method and Computer Program Thereof", English Machine Translation, pp. 1-8.*

Japanese Office Action dated Dec. 3, 2014, issued in counterpart Japanese Application No. 2012-206475.

Korean Office Action (and English translation thereof) dated May 29, 2015, issued in counterpart Korean Application No. 10-2013-0092819.

* cited by examiner

IMAGE CLASSIFYING APPARATUS FOR CLASSIFYING IMAGES AND ELECTRONIC ALBUM CREATING APPARATUS FOR CREATING ELECTRONIC ALBUM CONSISTING OF PLURAL IMAGES

CROSS-REFERENCE TO RELATED APPLICATION

The present application is based upon and claims the benefit of priority from the prior Japanese Patent Application No. 2012-206475, filed Sep. 20, 2012, the entire contents of which are incorporated herein by reference.

BACKGROUND OF THE INVENTION

1. Field of the Invention

The present invention relates to a technique, which selecting some images having connections with each other from among plural images and classifying the selected images into a group.

2. Description of the Related Art

In recent, it is popularized that plural images are shot, for example, by digital cameras and/or camera-equipped cellphones and recorded as image data, and these images are used for recording in an electronic album and/or printing out. For example, Japanese Unexamined Patent Publication No. 2008-250555 discloses a technique, which, when creating an electronic album, reads shooting dates and times from plural images entered or selected for printing and defines a range of the shooting dates and times of the plural shot images, and then creates album data, in which images having the shooting dates and times falling in the defined range are assigned to one page of the album. Using the technique, a user can enjoy creating the electronic album leaving good impression without performing a time-consuming and troublesome task.

SUMMARY OF THE INVENTION

According to one aspect of the invention, there is provided an image classifying apparatus, which comprises an image memory for storing plural candidate images, from which images are selected to be contained in at least one group, a designating unit for designating an image as a designated image to be contained in the group, from among the plural candidate images stored in the image memory, an attribute obtaining unit for obtaining attribute information attached to the designated image designated by the designating unit, a deciding unit for deciding selecting conditions of images based on the attribute information obtained by the attribute obtaining unit, a selecting unit for selecting at least one image as a selected image to be contained in the group, from among the plural candidate images stored in the image memory, based on the selecting conditions decided by the deciding unit, and a classifying unit for classifying both the designated image designated by the designating unit and the at least one selected image selected by the selecting unit into the group.

According to another aspect of the invention, there is provided an image classifying method in an image classifying apparatus, wherein the image classifying apparatus has an image memory for storing plural candidate images, from which images are selected to be contained in at least one group, the method, which comprises a designating process of designating an image as a designated image to be contained in the group, from among the plural candidate images stored in the image memory, an attribute information obtaining process of obtaining attribute information attached to the designated image designated in the designating process, a deciding process of deciding selecting conditions of images based on the attribute information obtained in the attribute information obtaining process, a selecting process of selecting plural images as selected images from among the plural candidate images stored in the image memory, based on the selecting conditions decided in the deciding process, and a classifying process of classifying both the designated image and the at least one selected image into the group.

According to other aspect of the invention, there is provided a non-transitory computer-readable recording medium having stored thereon a program for controlling operation of an image classifying apparatus, wherein the image classifying apparatus comprises a computer and an image memory for storing plural candidate images, from which images to be contained in at least one group are selected, and wherein the program, when read and executed on the computer, makes the computer function as a designating unit for designating an image as a designated image to be contained in the group, from among the plural candidate images stored in the image memory, an attribute obtaining unit for obtaining attribute information attached to the designated image designated by the designating unit, a deciding unit for deciding selecting conditions of images based on the attribute information obtained by the attribute obtaining unit, a selecting unit for selecting at least one image as a selected image to be contained in the group, from among the plural candidate images stored in the image memory, based on the selecting conditions decided by the deciding unit, and a classifying unit for classifying both the designated image designated by the designating unit and the at least one selected image selected by the selecting unit into the group.

According to still other aspect of the invention, there is provided an electronic album creating apparatus, which comprises an image memory for storing plural candidate images, from which images to be contained in an electronic album are selected, a designating unit for designating an image as a designated image to be contained in the electronic album, from among the plural candidate images stored in the image memory, an attribute obtaining unit for obtaining attribute information attached to the designated image designated by the designating unit, a deciding unit for deciding selecting conditions of images based on the attribute information obtained by the attribute obtaining unit, a selecting unit for selecting at least one as a selected images to be contained in the electronic album, from among the plural candidate images stored in the image memory, based on the selecting conditions decided by the deciding unit, and an album creating unit for creating the electronic album containing both the designated image designated by the designating unit and the at least one selected image selected by the selecting unit.

DETAILED DESCRIPTION OF THE PREFERRED EMBODIMENTS

Figure 1:
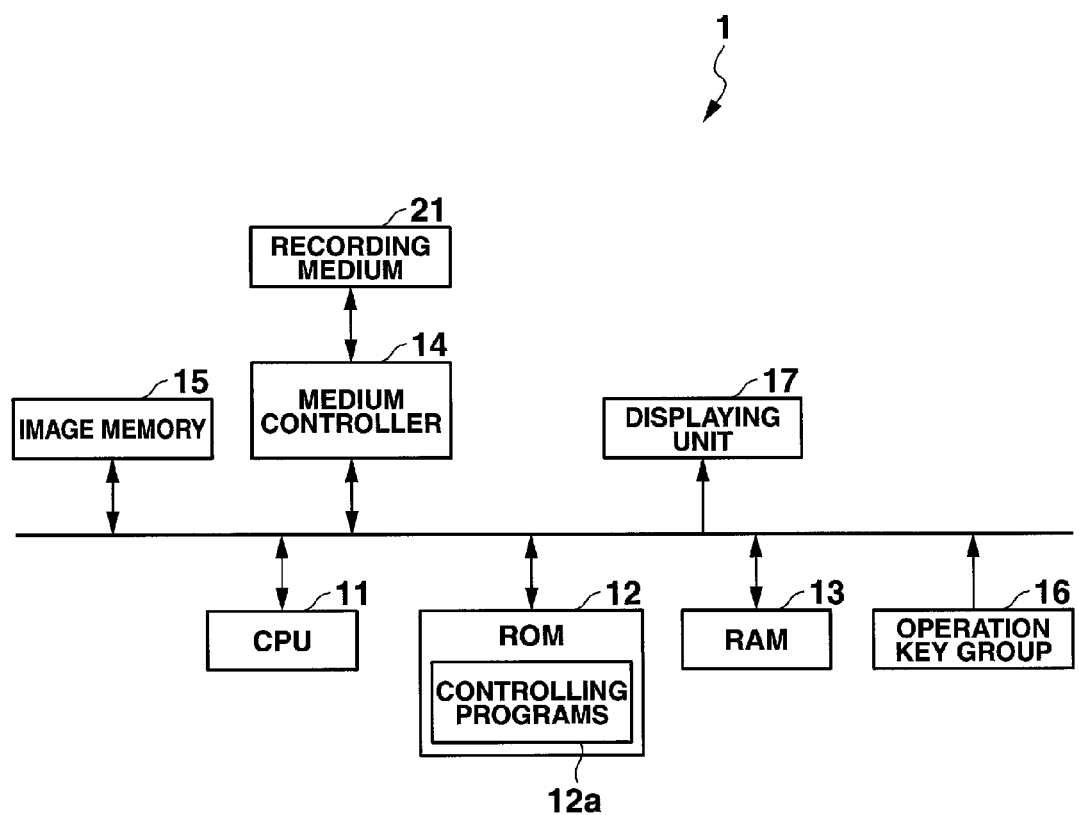
FIG. 1 is a schematic block diagram of a configuration of an album creating apparatus according to the present invention.

Now, the preferred embodiments of the present invention will be described with reference to the accompanying drawings in detail. FIG. 1 is a schematic block diagram of a configuration of an album creating apparatus 1, which is shown as an example of the preferred embodiments of the present invention.

The album creating apparatus 1 is constructed such that the whole operation thereof is controlled by CPU (Central Processing Unit) 11. CPU 11 is connected with ROM (Read Only Memory) 12, RAM (Random Access Memory) 13, a medium controller 14, an image memory 15, an operation key group 16, and a displaying unit 17.

ROM 12 serves to store various sorts of data and plural sorts of controlling programs 12a, which are used by CPU 11 for controlling the whole operations of the apparatus. An album creating program for CPU 11 to perform a process of creating an album is contained in the controlling programs 12a. The process of creating an album will be described later. In the various sorts of data stored in ROM 12 is contained data, which is used to specify places corresponding to GPS information (latitudes, longitudes), as will be described later. RAM 13 is a working memory, in which CPU 11 temporarily stores various sorts of data as needed.

The medium controller 14 is an input/output interface for controlling an input/output of data exchanged between CPU 11 and a recording medium 21. The recording medium 21 is detachably installed into a memory card slot provided in the body of the album creating apparatus 1.

The recording medium 21 is, for example, a card-type memory, which stores image data of pictures (shot images) taken, for example, by a digital camera. The image data stored in the recording medium 21 is, for example, in conformity with the Exif (Exchangeable Image File Format), and is compressed in accordance with the JPEG (Joint Photographic Expert Group) standard. The image data is also embedded with various sorts of attribute information and stored in an image file.

In the present embodiment of the invention, the attribute information includes a file name, a shooting date and time (date and time for shooting a picture) an image size, shooting conditions (for example, a shooting light source, a distance from an object, a flash-light state, a shutter speed, and the like), a name of a camera manufacturer, a shooting mode, GPS information (latitude, longitude), information representing an object, information representing an event and the like.

The image memory 15 is a built-in high-capacity memory of the album creating apparatus 1. The image memory 15 stores image data, which CPU 11 reads from the recording medium 21, and image data of album (album image data), which composes an electronic album to be described later. The album image data is image data of one sheet of album image composite with plural shot images that meet predetermined selecting conditions.

The operation key group 16 consists of plural operation keys, which are used by the user to operate the album creating apparatus 1. CPU 11 constantly scans the operated state of the operation keys of the operation key group 16, and detects an instruction, which the user enters by operating predetermined operation keys.

The displaying unit 17 consists of, for example, a color liquid crystal displaying panel with a back-light mounted on, and a driving circuit for driving the color liquid crystal displaying panel in accordance with data to be displayed (displaying data), such as the image data supplied from CPU 11.

Figure 2:
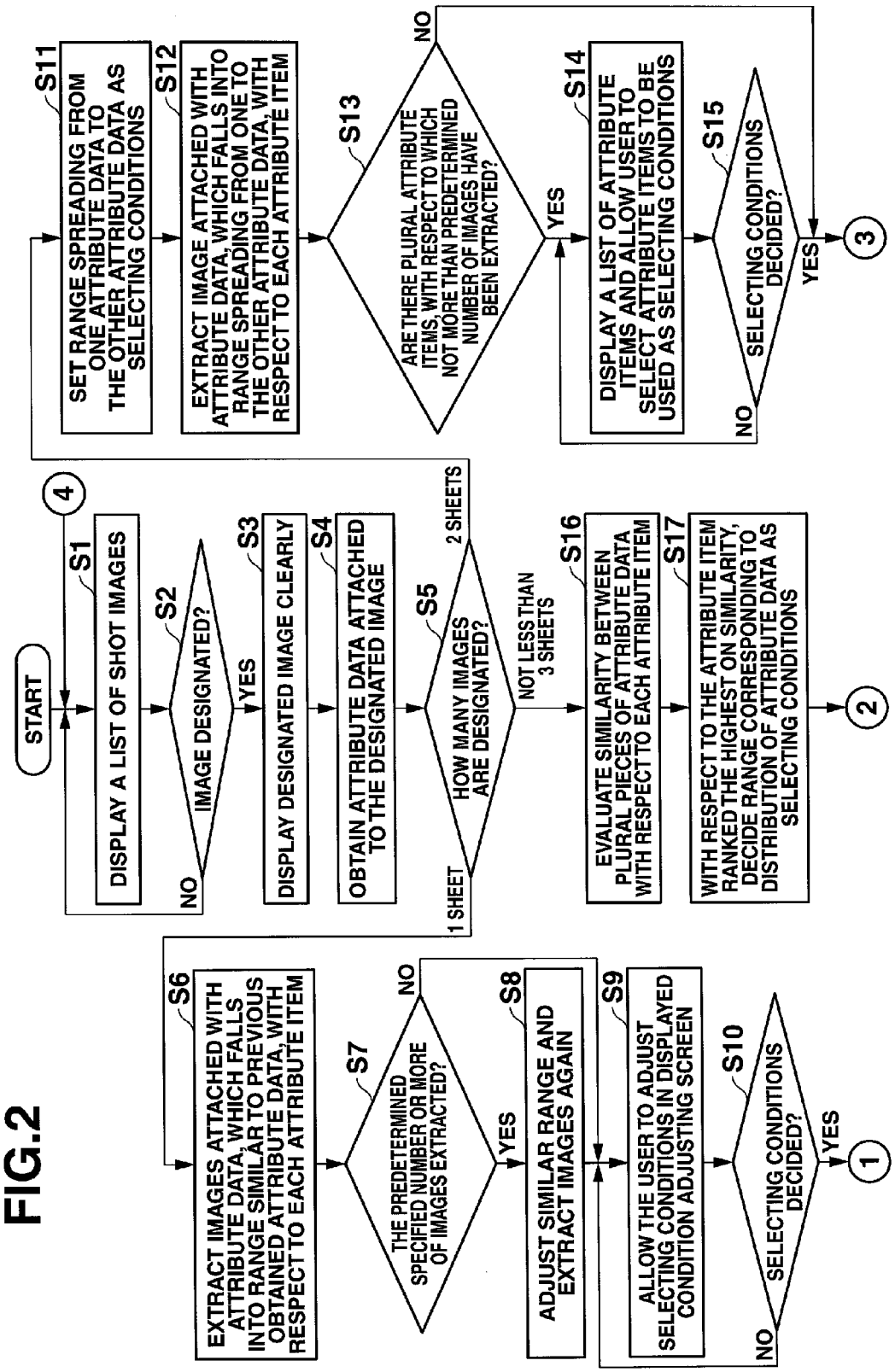
FIG. 2 and FIG. 3 are flow charts of a process of creating an album.

Hereinafter, an operation of the album creating apparatus 1 will be described, which operation is performed when an electronic album is created. FIG. 2 is a flow chart of a process performed by CPU 11 in accordance with the album creating program stored in ROM 12.

When the process starts in response to the predetermined key operation by the user, CPU 11 reads all the shot images stored in the image memory 15 (or in the recording medium 21) to display a list of the read images on the displaying unit 17 as candidate images (step S1). In the process at step S1, when the user designates a folder stored in the image memory 15 (or in the recording medium 21) as a storage place of the shot images, a list of only the shot images stored in the designated folder is displayed on the displaying unit 17.

Figure 4:
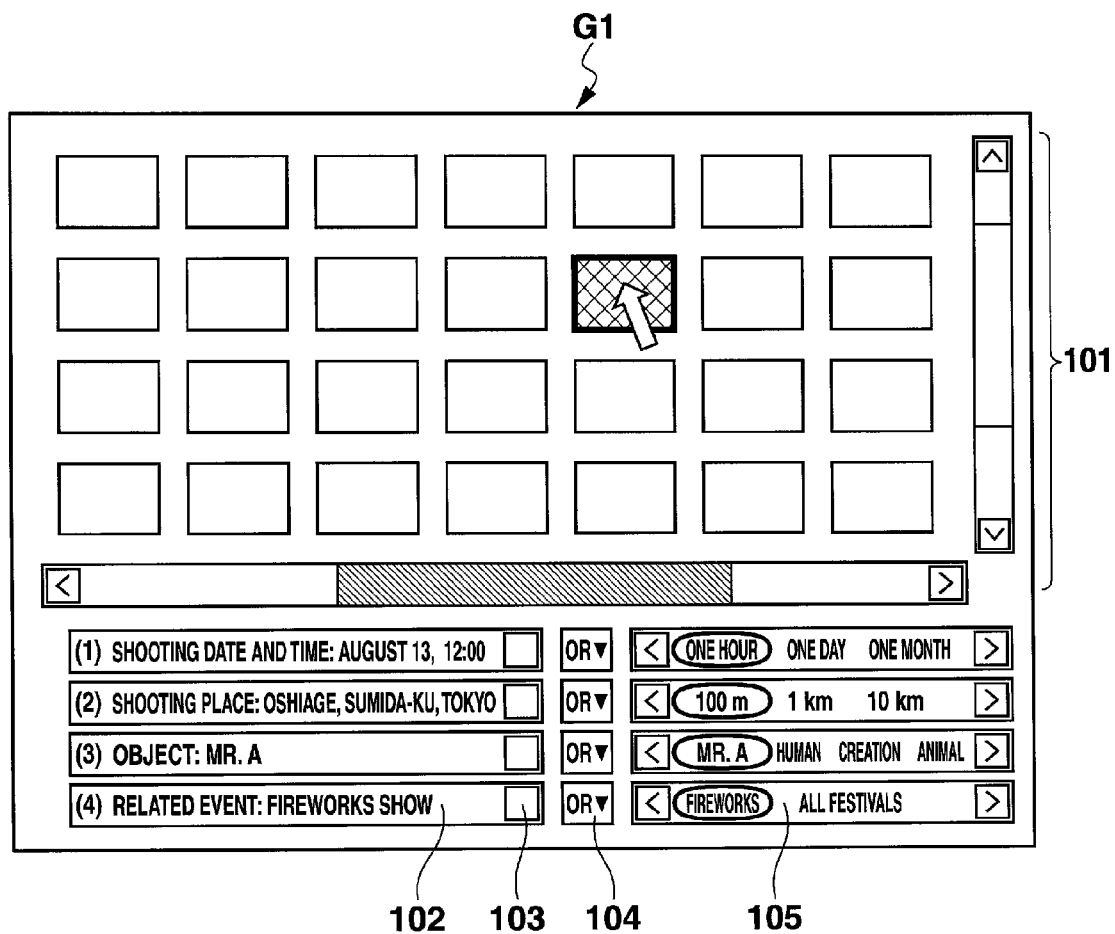
FIG. 4 is a view showing an example of a condition adjusting screen displayed on a displaying unit in the album creating apparatus.

When an image is designated in response to the predetermined key operation by the user (YES at step S2), CPU clearly displays the designated image (hereinafter, referred to as the "designated image") such that said designated image can be distinguishable from other images displayed on the displaying unit 17 as shown in FIG. 4 (step S3). In other words, the image cross-hatched and surrounded by a bold frame as shown in FIG. 4 is the designated image. Details of FIG. 4 will be described later.

CPU 11 obtains attribute data attached to the designated image (step S4). The attribute data obtained by CPU 11 in the process at step S4 is data relating to plural predetermined attribute items.

Thereafter, CPU 11 performs the following processes depending on the number of designated images. When one image is designated as in the initial process (one sheet of designated image: step S5), CPU 11 extracts images attached with attribute data, which falls into a range similar to the attribute data obtained in the process at step S4, with respect to each attribute item (step S6).

When the predetermined specified number or more of images have been extracted in the process at step S6 (YES at step S7), a reference for defining the range similar to the attribute data is adjusted. Again, CPU 11 extracts images attached with attribute data that falls into the adjusted range similar to the attribute data obtained in the process at step S4 (step S8). When less than the predetermined specified number of images have been extracted (NO at step S7), CPU 11 advances to step S9.

In the process at step S9, CPU 11 displays a condition adjusting screen G1 on the displaying unit 17 as shown in FIG. 4, allowing the user to adjust the selecting conditions. The condition adjusting screen G1 displayed on the displaying unit 17 contains the selecting conditions for selecting shot images to be contained in the album, the selecting conditions including the attribute items and the range of the attribute data, both set at present.

The condition adjusting screen G1 consists of an area (list displaying area) 101 for displaying a list of candidate images (shot images), plural attribute-data confirming windows 102 displayed in the lower portion of the list displaying area 101, and check boxes 103, condition selecting buttons 104, and range designating buttons 105, these boxes and buttons being corresponding to the attribute-data confirming windows 102, respectively. In the condition adjusting screen G1, the designated image is displayed cross-hatched and surrounded by the bold frame among candidate images indicated by framed rectangles in the list displaying area 101.

In the plural attribute-data confirming windows 102, contents of the attribute data attached to the designated image obtained at step S4 are displayed together with the attribute items. The check boxes 103 are used to select the attribute data to be used as the selecting conditions. The condition selecting buttons 104 are used to set under which condition plural pieces of attribute data are used, AND or OR conditions, when the plural pieces of attribute data of the attribute items are selected. The range designating buttons 105 are used to selectively set the range of the attribute data. The range of the selectable attribute data varies on the attribute items. For example, when the attribute item is the time and date of shooting a picture, the range of the attribute data is one of "one o'clock", "the first day", and "January".

CPU 11 reflects the attribute items and the range of the attribute data, both set at present, on the condition adjusting screen G1 initially displayed in the process at step S9. In the condition adjusting screen G1 shown in FIG. 4, the shooting place among the attribute items is a place specified based on GPS information.

In the process at step S9, CPU 11 clearly displays the image extracted in the process at step S6 or at step 8 (image cross-hatched and surrounded by the bold frame in FIG. 4), such that the extracted image can be distinguishable from other images in a list and the designated images displayed on the displaying unit 17. Every time the user adjusts the selecting conditions with the condition adjusting screen G1 displayed in the above manner, CPU 11 extracts images under the adjusted selecting conditions again and displays the extracted images, thereby updating the condition adjusting screen G1 displayed on the displaying unit 17. It is also possible not to display the image extracted while the selecting conditions are being adjusted.

Figure 5:
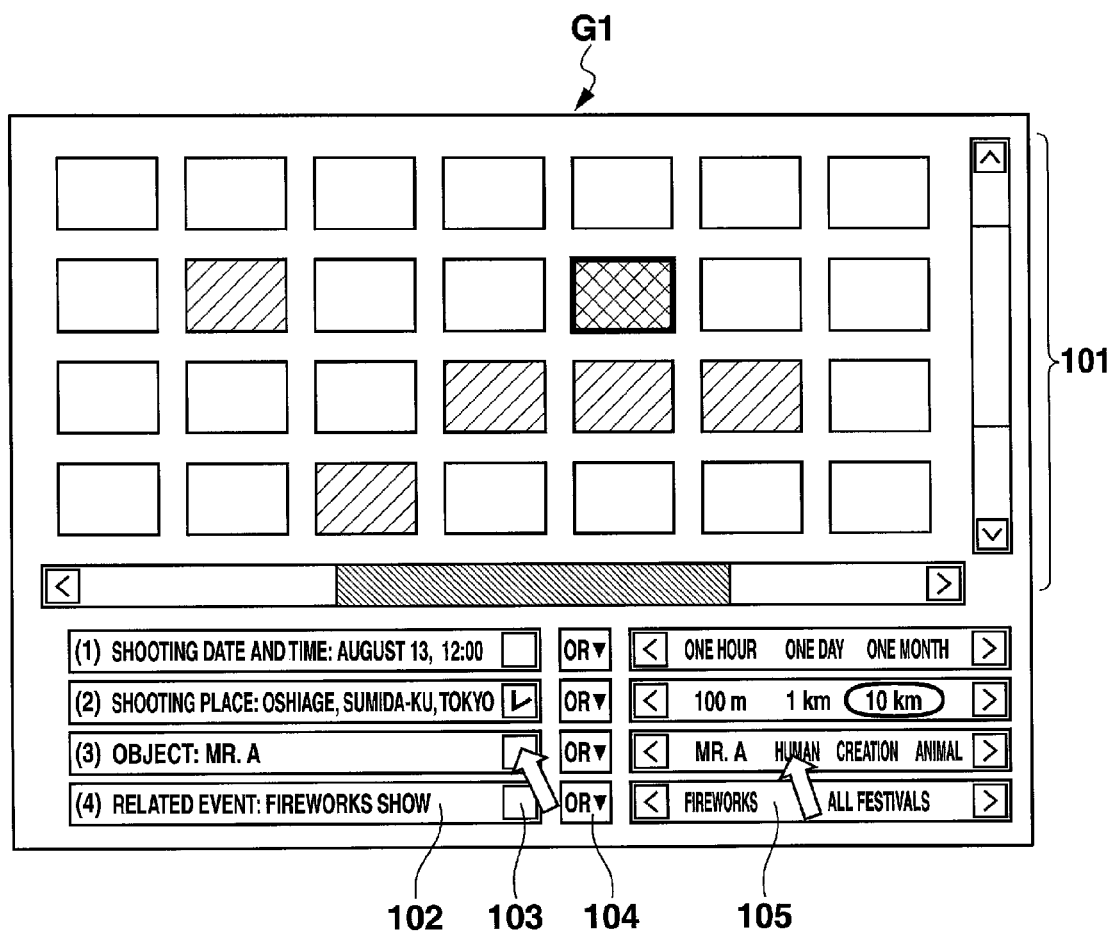
FIG. 5 is a view showing an example of an adjusted condition adjusting screen G1 displayed on the displaying unit in the album creating apparatus.

CPU 11 allows the user to adjust the selecting conditions including the attribute data (attribute items) to be used and the range of the attribute data in the condition adjusting screen G1. FIG. 5 is a view showing an example of the condition adjusting screen G1, in which the selecting conditions have been adjusted by the user.

When the user has given the instruction of having decided the selecting conditions (YES at step S10), CPU 11 advances to step S19 (FIG. 3), prompting the user to give an instruction as to whether the designated image is to be added or not. When an instruction of adding no designated image has been given (NO at step S19), CPU 11 advances to step S20.

Meanwhile, when an instruction of adding a designated image has been given (YES at step S19), CPU 11 returns to step S1 and performs the processes at step S1 to step S4, again. In other words, CPU 11 prompts the user to designate and add other shot image, and clearly displays the newly designated image in addition to the designated image previously and clearly displayed on the displaying unit 17. Then, CPU 11 obtains the attribute data attached to the newly designated image.

When two images have been designated (two designated images) (two sheets of designated images : step S5), CPU 11 obtains two pieces of attribute data respectively from the two sheets of designated images. And then CPU 11 decides on the range spreading from one of the two pieces of attribute data to the other piece of attribute data as the range of the attribute data, which specifies the selecting conditions for selecting shot images to be contained in the album, with respect to each attribute item (step S11).

For example, when the attribute item is a date and time for shooting a picture, the decided range of the attribute data will be a time period from the date and time of shooting one designated image to the date and time for shooting the other designated image. When the attribute item is a shooting place, the decided range of the attribute data will be a shooting place and/or an area between the shooting place of one of the two designated images and the shooting place of the other designated image. Further, when the attribute item corresponds to information representing a sort of an object or an event, the decided range of the attribute data will be a conceptual range corresponding to the sort of the object or the event in the two designated images.

With respect to each attribute item, CPU 11 extracts shot images attached with the attribute data falling into the range (selecting conditions) from among a list of candidate images displayed on the displaying unit 17 (step S12).

When there are plural attribute items, with respect to which item not more than the predetermined number of images have been extracted (YES at step S13), CPU 11 allows the user to select the attribute items to be used as the selecting conditions (step S14).

Figure 6:
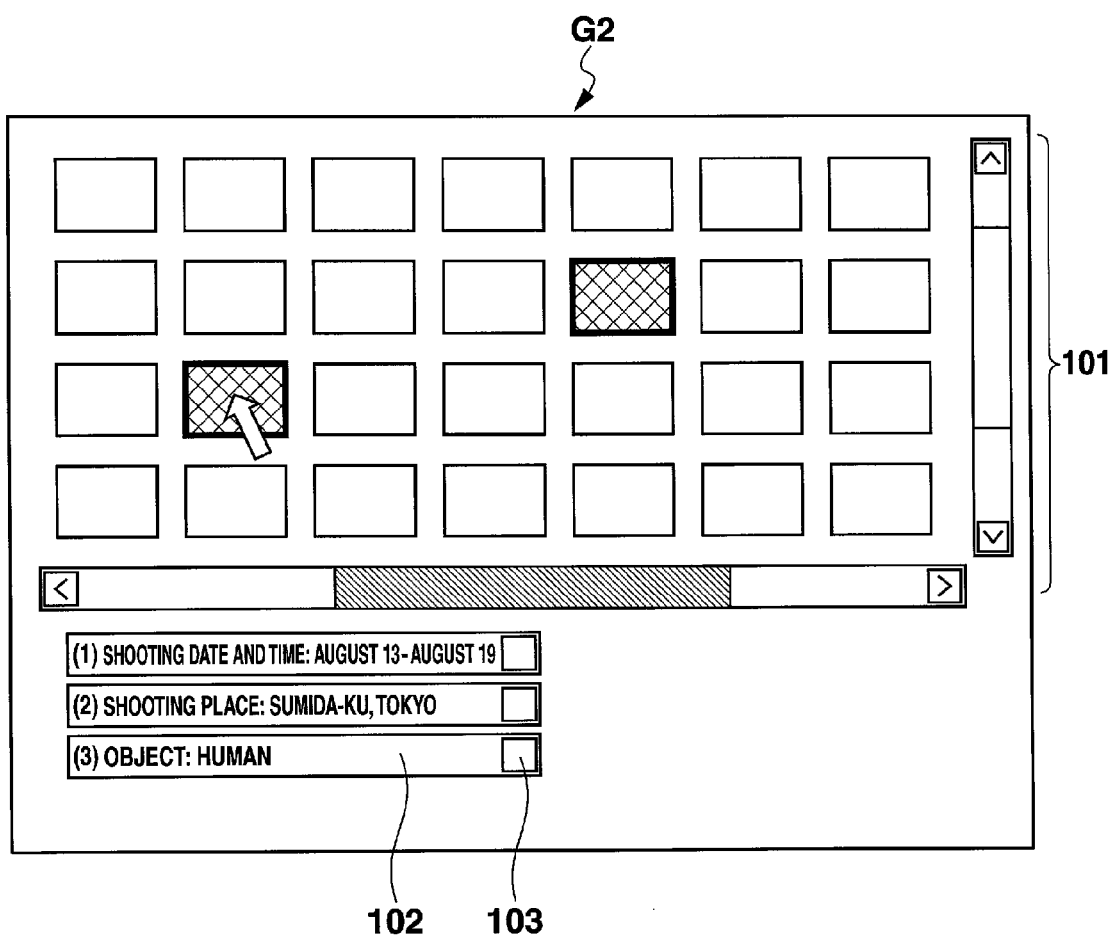
FIG. 6 is a view showing an example of an attribute selecting screen G2 displayed on the displaying unit in the album creating apparatus.

In this case, CPU 11 displays on the displaying unit 17 an attribute selecting screen G2, which contains a list of attribute items, with respect to which item not more than the predetermined number of images have been extracted, as shown in FIG. 6, and allows the user to select the attribute items in the displayed attribute selecting screen G2. The attribute selecting screen G2 consists of the list displaying area 101 for displaying the candidate images (shot images), plural attribute-data confirming windows 102, and check boxes 103, displayed in the lower portion of the list displaying area 101.

More particularly in the process at step S14, CPU 11 clearly displays the shot images extracted in the process at step S12 (the images cross-hatched and surrounded by the bold frame in FIG. 6) such that the extracted shot images can be distinguishable from other images in a list and the designated images displayed on the displaying unit 17. Every time the user adjusts the selecting conditions (selects the attribute items) with the attribute selecting screen G2 displayed in the above manner, CPU 11 extracts images under the adjusted selecting conditions again and displays the extracted images, thereby updating the attribute selecting screen G2 displayed on the displaying unit 17. It is also possible not to display images extracted while the selecting conditions are being adjusted.

Figure 3:
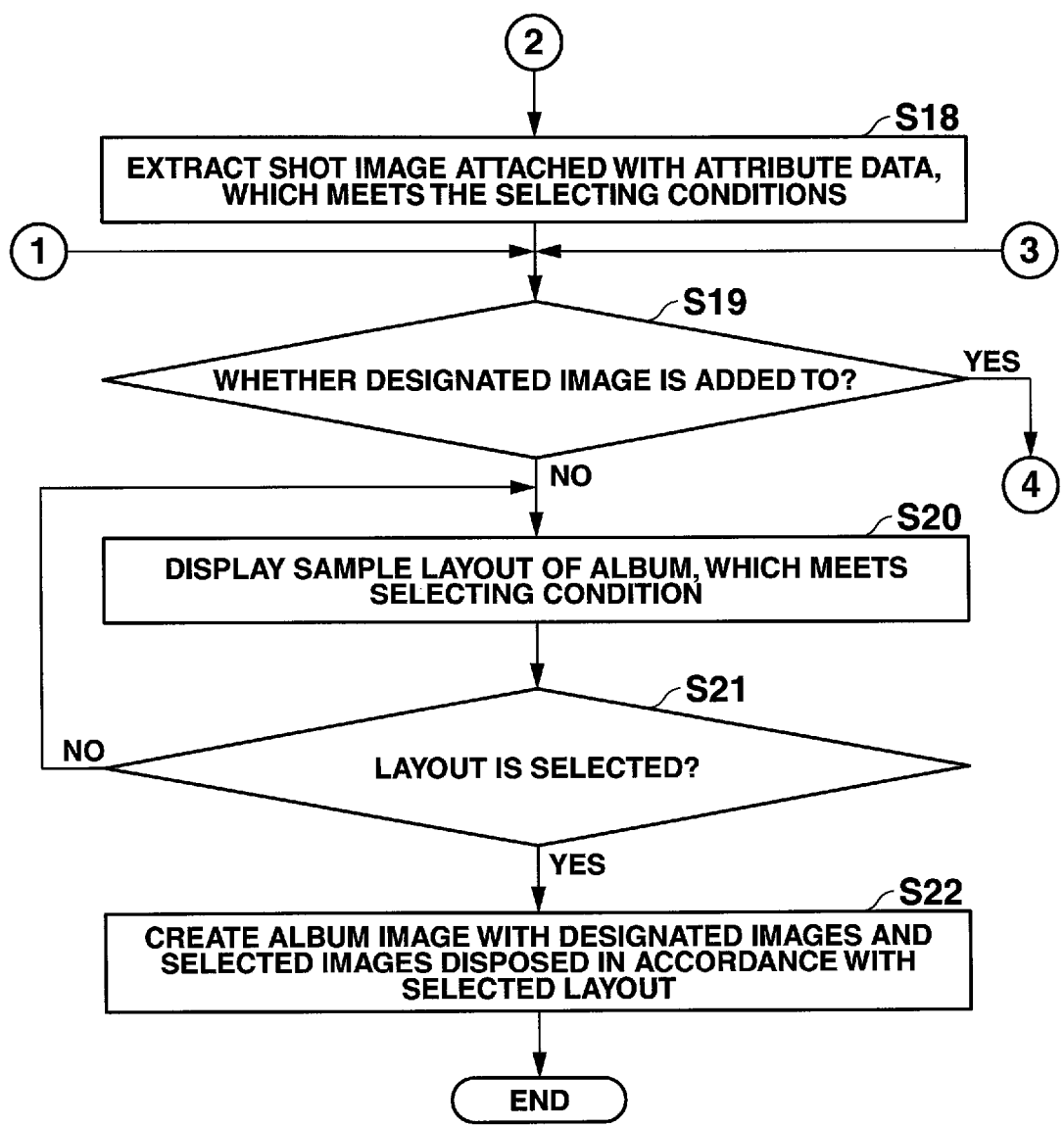

Thereafter, when the user has given the instruction of having decided the selecting conditions (YES at step S15), CPU 11 advances to step S19 (FIG. 3). Meanwhile, when there is a single attribute item, with respect to which item not more than the predetermined number of images have been extracted (NO at step S13), CPU 11 advances to step S19 in FIG. 3.

In the process at step S19, CPU 11 prompts the user to decide on whether the designated image is added or not. When the user has given the instruction of adding no designated image (NO at step 19), CPU 11 performs the processes at step S20 and the following steps, as will be described later.

When the user has given the instruction of adding designated images (YES at step 19), CPU 11 returns to step S1, performing the processes at step S1 to step S4, again. More particularly, CPU 11 prompts the user to designate and add other shot image, and clearly displays the newly designated image in addition to the designated image previously and clearly displayed on the displaying unit 17. Then, CPU 11 obtains the attribute data attached to the newly designated image.

Figure 7A:
FIGS. 7A, 7B, and 7C are views conceptually showing relationships among plural pieces of attribute data concerning the same attribute item.
Figure 7B:
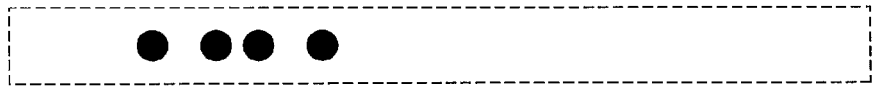

When three images have been designated (three designated images) (three sheets of designated images : step S5), CPU 11 evaluates a similarity between plural pieces of attribute data attached respectively to all the designated images with respect to each attribute item (step S16). In this case, CPU 11 arranges the plural pieces of attribute data in accordance with the standard decided for each attribute item, and evaluates the similarity between the plural pieces of attribute data based on the distribution of the plural pieces of attribute data. For instance, in the case where only one piece of attribute data is separate from other pieces of attribute data, as shown in FIG. 7A, CPU 11 decides that the similarity between these pieces of attribute data is low. In the case where all pieces of attribute data hold together, as shown in FIG. 7B, CPU 11 decides that the similarity between these pieces of attribute data is high. CPU 11 evaluates the similarity level among the plural pieces of attribute data at plural stages common among all the attribute items. In other words, CPU 11 obtains either of levels "1" to "n" as the result of the evaluation of the similarity between the plural pieces of attribute data.

Figure 7C:

Even though all the plural pieces of attribute data are separate from each other as shown in FIG. 7C, it is possible to decide that the similarity between these pieces of attribute data is high, if the plural pieces of attribute data hold together within a range relatively narrower than a spread distribution of the plural pieces of attribute data attached to the plural candidate images other than the designated images. FIGS. 7A, 7B, and 7C are views conceptually showing relationships among plural pieces of attribute data, taking as an example the attribute item such as the shooting dates and times (the dates and times of shooting a picture), plural pieces of attribute data corresponding to which attribute item have a relationship that can be linearly represented.

With respect to the attribute item, which is ranked the highest on similarity, CPU 11 decides a range of data (data range) corresponding to the distribution of the plural pieces of attribute data as the selecting conditions (step S17). The data range corresponding to the distribution of the plural pieces of attribute data is a range decided based on the variation and the average of the plural pieces of attribute data. For example, when a distribution specified based on the average and the deviation of the plural pieces of attribute data is a normal distribution, the data range is a range having the average at the center.

Figure 8:
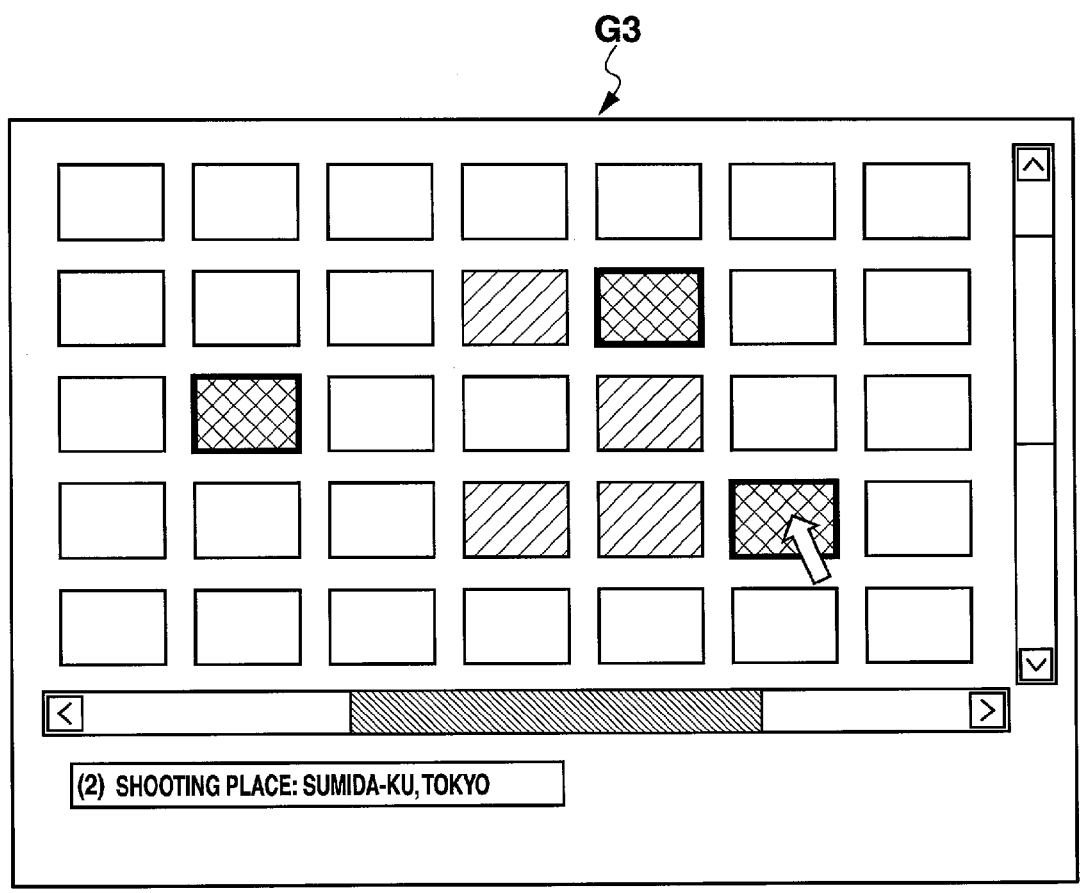
FIG. 8 is a view showing an example of a condition confirming screen G3 displayed on the displaying unit.

CPU 11 extracts shot images attached with the attribute data, which meets the decided selecting conditions (range) (step S18 in FIG. 3). In the process at step S18, CPU 11 displays a condition confirming screen G3 on the displaying unit 17, which screen contains the attribute item, which is ranked the highest on similarity and the extracted images clearly indicated such that said images can be distinguishable from the designated images and other images displayed in a list. FIG. 8 is a view showing an example of the condition confirming screen G3 displayed in the case that the attribute item having the highest similarity is the shooting place.

CPU 11 prompts the user to decide on whether the designated image is added to or not. When the user has given the instruction of adding no designated image (NO at step 19), CPU 11 performs the processes at step S20 and the following steps, as will be described later.

When the user has given the instruction of adding a designated image (YES at step 19), CPU 11 returns to step S1, performing the processes at step 16 to step S18, again.

The process to be performed when the instruction of adding no designated image is given (NO at step 19) will be described. In the process at step S20, CPU 11 displays sample layouts of the album, which meet either of the previously described selecting conditions, on the displaying unit 17, allowing the user to designate his or her desired layout.

The sample layout of the album, which meets the selecting condition shows the number of images, sizes of the images, a layout of the images, and a background, which are previously decided for each page of the album in accordance with the attribute item of the attribute data decided to be used as the selecting conditions.

FIGS. 9A, 9B, 9C, and 9D are views illustrating the sample layouts of the album by way of example for convenience. The sample layout shown in FIG. 9A has contents selected with the reference of the "shooting date and time", and shows available layouts, the first layout L1 and the second layout L2. When the attribute data in the selecting conditions decided in the previous process relates to the attribute item of the "shooting date and time", the sample layouts L1 and L2 are displayed on the displaying unit 17.

Figure 9A:
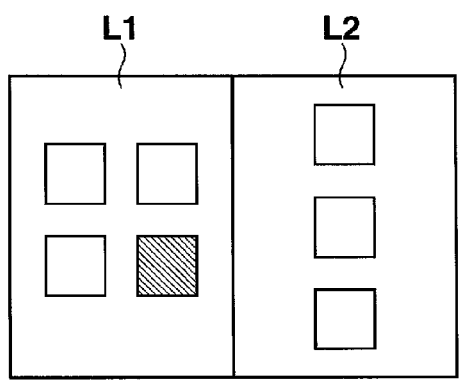
FIGS. 9A, 9B, 9C, and 9D are views illustrating the sample layouts of the album corresponding respectively to attribute items different from each other.
Figure 9B:
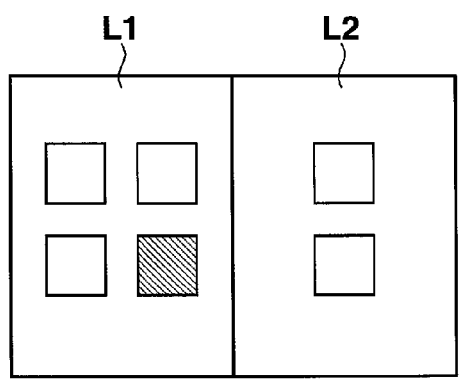
Figure 9C:
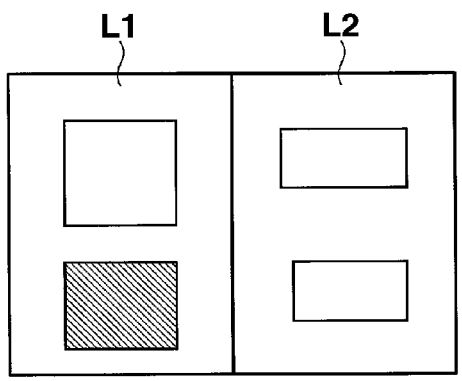
Figure 9D:
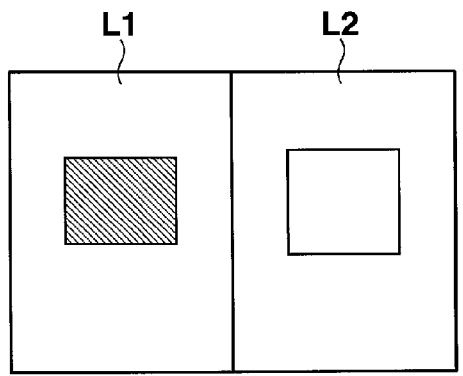

The sample layout shown in FIG. 9B has contents selected with reference to the attribute item of the "shooting place". The sample layout shown in FIG. 9C has contents selected with reference to the attribute item of the "event". The sample layout shown in FIG. 9D has contents selected with reference to the mixed attribute items. Also the sample layouts of FIGS. 9B, 9C, and 9D show the available first and second layouts L1, L2.

In the process at step S20, with one of the sample layouts shown in FIGS. 9A to 9D displayed on the displaying unit 17, CPU 11 prompts the user to select one of the first layout L1 and the second layout L2 by operating the key of the operation key group 16.

When one of the layouts L1, L2 is selected by the user (YES at step S21), CPU 11 creates one or plural pages of album images, in each of which the designated images and the selected images are disposed in accordance with the selected layout. Further, CPU 11 stores data of the created album images in the image memory 15 or the recording medium 21 (step S22).

In the album creating apparatus 1 according to the present embodiment of the invention, when the electronic album is created, CPU 11 prompts the user to designate his or her desired image out of the candidate images, which are to be contained in such electronic album. The attribute data attached to the designated image is obtained, and then the selecting conditions of images are decided based on the obtained attribute data. Images, which are to be contained in the electronic album are selected out of the candidate images based on the decided selecting conditions.

Further in the album creating apparatus 1, when the user designates plural images (plural designated images) out of the candidate images, then the selecting conditions are automatically decided with reference to the attribute data of the attribute items attached to the respective designated images, and the images, which are to be contained in the electronic album are selected based on the decided selecting conditions.

As described above, the user is allowed to select plural images having his or her desired connection without failure. Simply designating plural images having the user's own desired connection, the user can create an electronic album, which contains the designated images and other images having the connection intended by the user. In other words, the user's desired album can be created without difficulty by the user's instinctive operation.

As more images are designated, with more enhanced accuracy plural images having the user's intended connection can be selected.

Particularly in the present embodiment of the invention, when two images are designated by the user (in the case of two designated images), the range of the attribute data to be used as the selecting conditions is confined with respect to each attribute item, and such range is set to the specific range spreading from the attribute data attached to one of the designated images to the attribute data attached to the other designated image. As a result, without requiring the user to set the selecting conditions in detail, plural images having the user's intended connection can be selected with a certain level of accuracy.

Further in the present embodiment of the invention, when two images are designated by the user (in the case of two designated images), the attribute items of the attribute data to be used as the selecting conditions are confined to such attribute items that the number of pieces of attribute data attached to said attribute items falling into the above mentioned specific range will be a prescribed number or less. As a result, it can be avoided that the unnecessary large number of images are finally selected.

Furthermore, when plural attribute items have been set, the number of pieces of whose attribute data falling in the above mentioned specific range is the prescribed number or less, the attribute item(s) of the attribute data to be used as the selecting conditions can be confined to the user's desired one item or only to the user's desired attribute items. Therefore, simply allowing the user to select the user's desired attribute item (s), the album creating apparatus 1 can avoid the unnecessary large number of images from being finally selected.

In the present embodiment of the invention, the attribute items of the attribute data to be used as the selecting conditions as described above are confined to the attribute items, the number of pieces of whose attribute data falling in the above mentioned specific range is the prescribed number or less. In other words, the attribute items of the attribute data to be used as the selecting conditions are confined to the attribute items, the number of pieces of whose attribute data is a predetermined fixed number or less, but it is possible to allow the user to select and set such fixed number as needed.

In the present embodiment of the invention, when three images are designated by the user (in the case of three designated images or more), the attribute data to be used as the selecting conditions is confined to such attribute data that relates to the specific attribute item selected from among plural attribute items and ranked the highest on the overall similarity between plural pieces of attribute data attached to the respective designated images. As a result, without requiring the user to set the selecting conditions in detail, plural images having the user's intended connection can be selected with a certain level of accuracy.

Further in the present embodiment of the invention, when three images are designated by the user (in the case of three designated images), the range of the attribute data relating to the above mentioned specific attribute items is confined to be used as the selecting conditions, and said range is set to the range defined based on the variation and the average of plural pieces of attribute data. As a result, plural images having the user's intended connection can be selected with a higher level of accuracy.

In the present embodiment of the invention, the attribute data to be used as the selecting conditions as described above is confined to such attribute data that relates to the specific attribute item selected from among plural attribute items and ranked the highest on the overall similarity between plural pieces of attribute data of the respective designated images, and the overall similarity between plural pieces of attribute data is evaluated at plural stages common to all the attribute items. As a result of the evaluation of the similarity, either of levels "1" to "n" is given to the overall similarity.

When specifying the attribute item ranked the highest on the overall similarity between plural pieces of attribute data, the levels of the similarity obtained as the result of the evaluation of the similarity are given weights predetermined for each attribute item, and it is possible to specify the attribute item ranked the highest on the overall similarity between the plural pieces of attribute data, based on the weighted levels of the similarity.

In the present embodiment of the invention, the attribute items of the attribute data to be used as the selecting conditions, that is, the attribute date of the attribute items to be included in the selecting conditions is confined to the attribute data relating to the specific attribute item ranked the highest on the overall similarity between plural pieces of attribute data, but the following rearrangement can be made.

As more images are designated as the designated images, with more enhanced accuracy the overall similarity between plural pieces of attribute data can be evaluated with respect to each attribute item. Therefore, the attribute items to be included in the selecting conditions are confined to one or plural attribute items, whose attribute data has the overall similarity of the level higher than a predetermined reference level, and said reference level is increased in a step by step manner as more images are designated, whereby it is possible to decrease the number of designated images to be included in the selecting conditions as more images are designated.

As described above, the overall similarity between plural pieces of attribute data is evaluated with enhance accuracy. Therefore, when plural attribute items are included in the selecting conditions, the ranges of the attribute data attached to the respective attribute items are used under AND condition in the selecting conditions, whereby plural images having the user's intended connection can be selected with a higher level of accuracy.

In the above description of the present embodiment of the invention, the album creating apparatus 1 has been described, which creates an electronic album of one or plural pages, each page containing the designated images and the automatically selected images arranged thereon. But the present invention can be also applied to apparatuses, which create album data that records or contains information relating to an image layout (the number of images, sizes of the images, a layout of the images, and background) of each page and information of identifying images arranged on each page.

For instance, the album creating apparatus 1 described above can be put into practical use, when such apparatus 1 is installed in consumer digital cameras and/or camera-equipped cell-phones. Further, the present invention will be put to practical use, when application software is installed in general-purpose computers to make the computers perform the processes shown in FIG. 2 and FIG. 3.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. An image classifying apparatus comprising:
   a processor configured to perform operations including:
      designating plural images as designated images;
      obtaining attribute information attached respectively to the plural designated images;
      deciding selecting conditions of images, the selecting conditions defining a range of the attribute information based on a variation of plural pieces of the obtained attribute information;
      selecting, from among plural images, an image having attached attribute information falling into the range of the attribute information as a selected image which is an image to be classified into a predetermined group; and
      classifying the selected image selected by the selecting unit into the predetermined group,
   wherein the processor defines the range of the attribute information based on the variation and an average of the plural pieces of attribute information.

2. The image classifying apparatus according to claim 1, wherein the processor classifies the selected image and the designated images into the predetermined group as a group of images to be contained in an electronic album; and
   wherein the processor creates an electronic album consisting of the images into the predetermined group.

3. The image classifying apparatus according to claim 1, wherein the processor obtains plural pieces of attribute information corresponding respectively to plural attribute items from the respective designated images; and
   wherein the processor decides the selecting conditions based on the plural pieces of attribute information corresponding respectively to plural attribute items.

4. The image classifying apparatus according to claim 3, wherein the processor decides the selecting conditions to define a range of the attribute information for each of the attribute items, based on the plural pieces of attribute information corresponding respectively to the plural attribute items; and
   wherein the processor selects from among the plural images, as selected images, images having attached attribute information of each of the attribute items falling into the ranges of the attribute information of the attribute items, respectively.

5. The image classifying apparatus according to claim 1, wherein the processor designates images as the designated images in accordance with an instruction given by a user; and
   wherein the processor automatically selects plural images as selected images based on the selecting conditions.

6. The image classifying apparatus according to claim 1, wherein the processor designates images as the designated images in accordance with an instruction given by a user; and
   wherein the processor changes how the selecting conditions are decided, based on the number of designated images.

7. The image classifying apparatus according to claim 6, wherein when two images have been designated as designated images, the processor defines the range of the attribute information to spread from the attribute information of one of the two designated images to the attribute information of the other of the two designated images; and
   wherein when three or more images have been designated as designated images, the processor defines the range based on the variation and an average of the plural pieces of attribute information.

8. An image classifying apparatus comprising:
   a processor configured to perform operations including:
      designating plural images as designated images;
      obtaining attribute information attached respectively to the plural designated images;
      deciding selecting conditions of images, the selecting conditions defining a range of the attribute information based on a variation of plural pieces of the obtained attribute information;
      selecting, from among plural images, an image having attached attribute information falling into the range of the attribute information as a selected image which is an image to be classified into a predetermined group; and
      classifying the selected image selected by the selecting unit into the predetermined group,
   wherein the processor designates images as the designated images in accordance with an instruction given by a user;
   wherein the processor changes how the selecting conditions are decided, based on the number of designated images;
   wherein the processor obtains plural pieces of attribute information corresponding respectively to plural attribute items from the respective designated images;
   wherein the processor selects all of the plural attribute items to be included in the selecting conditions, when two images have been designated as designated images; and
   wherein the processor includes fewer than all of the plural attribute items to be included in the selecting conditions, when three or more images have been designated as designated images.

9. The image classifying apparatus according to claim 8, wherein when three or more images have been designated as designated images, the processor evaluates, for each attribute item, a similarity between the plural pieces of attribute information for the attribute item, and selects an attribute item which is ranked highest in the similarity between the plural pieces of attribute information, as an attribute item to be included in the selecting conditions.

10. The image classifying apparatus according to claim 8, wherein each time a new image is designated as one of the plural designated images, the processor repeats the obtaining of the attribute information, the deciding of the selecting conditions, and the selecting an image as the selected image.

11. The image classifying apparatus according to claim 10, wherein the processor decreases the number of attribute items included in the selecting conditions, every time the number of designated images designated by the user increases.

12. An image classifying apparatus comprising:
a processor configured to perform operations including:
designating plural images as designated images;
obtaining attribute information attached respectively to the plural designated images;
deciding selecting conditions of images, the selecting conditions defining a range of the attribute information based on plural pieces of the obtained attribute information:
selecting, from among plural images, an image having attached attribute information falling into the range of the attribute information as a selected image which is an image to be classified into a predetermined group; and
classifying the selected image selected by the selecting unit into the predetermined group;
wherein the process defines the range of attribute information such that a number of selected images will be a predetermined target number or less;
wherein the processor obtains plural pieces of attribute information corresponding respectively to plural attribute items from the respective designated images;
wherein the processor presents the plural attribute items to a user to be selectable by the user for inclusion in the setting conditions;
wherein when an attribute item has been designated by a user as an attribute item to be included in the selecting conditions, the processor defines the range of the attribute information to be a range of the attribute information for the attribute item designated by the user such that the number of selected images will be the predetermined target number or less.

13. An image classifying method executed by a processor of an image classifying apparatus, the method comprising:
designating plural images as designated images;
obtaining attribute information attached respectively to the plural designated images;
deciding selecting conditions of images, the selecting conditions defining a range of the attribute information based on a variation of plural pieces of the obtained attribute information;
selecting, from among plural images, an image having attached attribute information falling into the range of the attribute information as a selected image which is an image to be classified into a predetermined group; and
classifying the selected image selected by the selecting unit into the predetermined group;
wherein the range of the attribute information is defined based on the variation and an average of the plural pieces of attribute information.

14. A non-transitory computer-readable recording medium having stored thereon a program executable by a computer of an image classifying apparatus, to perform functions comprising:
designating plural images as designated images;
obtaining attribute information attached respectively to the plural designated images;
deciding selecting conditions of images, the selecting conditions defining a range of the attribute information based on a variation of plural pieces of the obtained attribute information;
selecting, from among plural images, an image having attached attribute information falling into the range of the attribute information as a selected image which is an image to be classified into a predetermined group; and
classifying the selected image selected by the selecting unit into the predetermined group;
wherein the range of the attribute information is defined based on the variation and an average of the plural pieces of attribute information.

* * * * *